Dec. 21, 1948.  C. A. PIERSON  2,456,988
BROILER PAN GUARD
Filed Dec. 5, 1945
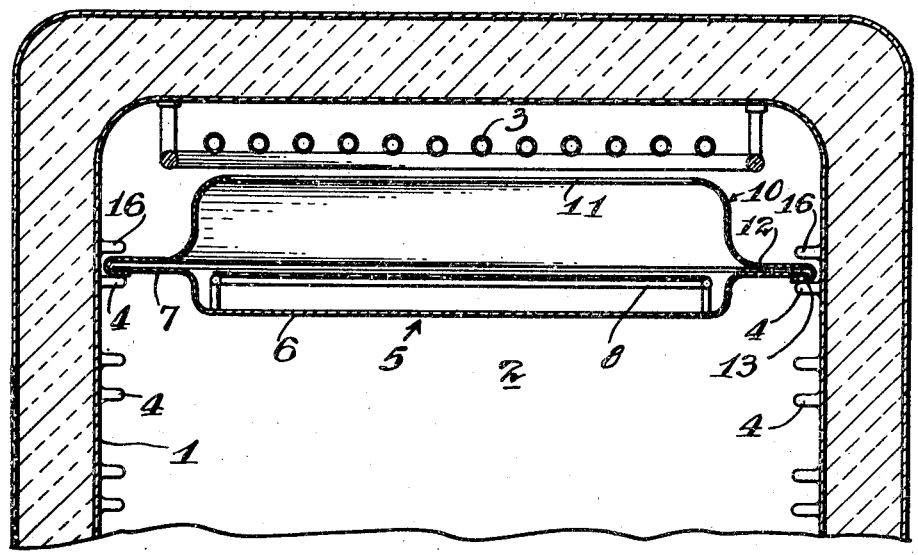
FIG-1-
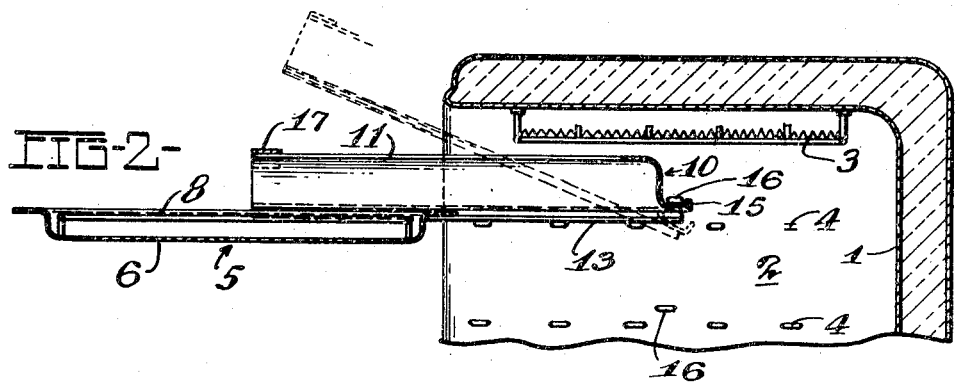
FIG-2-
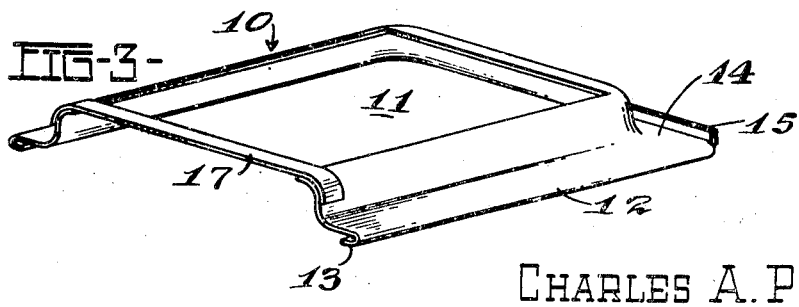
FIG-3-
Inventor
CHARLES A. PIERSON
By Owen & Owen
Attorneys

UNITED STATES PATENT OFFICE 2,456,988

BROILER PAN GUARD

Charles A. Pierson, Maumee, Ohio, assignor to Associated Products, Inc., Toledo, Ohio, a corporation of Ohio Application December 5, 1945, Serial No. 632,902

7 Claims. (Cl. 99—446)

This invention relates to cooking appliances, and particularly to means for use in connection with broiling pans to prevent the spattering or flying of grease particles from meat and against the adjacent walls of the oven during broiling.

Considerable objection to the use of meat broiling pans in closed ovens is encountered due to the accumulation on the adjacent oven walls, and particularly in the upper corners and angles thereof, of grease resulting from the broiling operation. The broiler pan is freely removable from the oven and can therefore be easily cleaned. It is difficult, however, to clean the grease from the oven walls, corners and angles, and the proper cleaning of such grease is, therefore usually neglected, resulting in an unsanitary condition.

An object of the invention is the provision of simple and efficient means for use in connection with a broiler pan, when meat is being broiled, to prevent the resulting flying or spattering grease from striking the oven walls or from having any lateral dispersing action relative to the pan without interfering in any way with the broiling action.

Another object of the invention is the provision of a spatter preventing means for broiling pans which is insertable into or removable from an oven with the pans, or separately therefrom, and which is capable of being easily cleaned the same as the pan to remove grease therefrom.

Another object of the invention is the provision of means of the class described which serves as a guide for the broiler pan in its movement into or out of an oven and also serves to support the pan in projected position forwardly of the oven to facilitate inspection, turning or removal of the meat, thus making it unnecessary to entirely remove the pan from the oven and rest it in its hot condition on some other object for such purpose.

The invention is fully described in the following specification, and one embodiment thereof illustrated in the accompanying drawings, in which—

Fig. 1 is a fragmentary vertical section of a range oven, with a broiler pan and guard in broiling position therein and in vertical section; Fig. 2 is a fragmentary vertical section of the oven from front to rear showing the broiler pan guard withdrawn to stop position from the open and the broiler pan partially withdrawn from the guard, and Fig. 3 is a top perspective view of the guard member embodying the invention.

Referring to the drawings, 1 designates an oven lining of the type customarily used in the ovens of cooking ranges the front of which is closed by a door or doors (not shown), and which is exposed for its entire width when open. The oven forms a compartment 2 suitable for broiling and such compartment is provided within its top portion with a burner 3 for the purpose, such burner in the present instance being of the electric type.

The side walls of the oven are provided interiorly of the compartment with one or more sets of supports 4 on which the side edges of a broiler pan 5 may rest for sliding horizontal movements into and out of the oven. In the present instance, these supports are in the nature of horizontally spaced buttons with a set at each side of the oven.

The broiler pan 5 is of customary form, having the depressed pan portion 6 with a marginal edge flange 7. The side portions of this flange engage over the respective side supports 4 which guide the inward and outward movements of the pan. Meat is supported in suitable elevated position above the pan bottom by a rack 8 preferably comprising a plurality of narrow cross-bars in narrowly spaced parallel relation. The purpose of this, as understood in the art, is to permit the grease to drip from the meat through the spaces between the bars to the pan bottom and at the same time preventing the grease from burning by protecting it from the burner head.

The spatter guard 10, in which the primary feature of the invention resides, is generally in the form of an inverted pan with the pan or dome portion thereof provided with a top opening 11 extending to near its side and end walls and with such walls preferably deeper than and of a horizontal cross-sectional shape substantially the same as that of the broiler pan, except that its front end or that adjacent to the oven door, when inserted within the oven, is preferably open, as shown. The closed side walls of the guard terminate at their lower edges in outwardly extending flanges 12 of a width substantially corresponding to that of the broiler pan flanges 7 and terminating at their outer edges in turned-under portions 13 for freely engaging around the side edges of the broiler pan flanges when the guard and pan are in assembled relation. The portions 13 are intended to slidingly rest on the supports 4, and when engaged with the broiler pan flanges, to support and form runways therefor.

The flange 14 at the rear closed side of the guard 10 need not be as wide as the side flanges 12 and is formed at its free edge with an upturned lip 15. The purpose of this lip is to engage stop lugs 16 projecting from the side walls of the oven above the supports 12 and to limit the outward sliding movements of the guard relative to the oven. These stop lugs 16 are disposed intermediate a pair of supporting lugs 4 at each side of the oven, thus permitting the guard, or the guard and broiler pan, when assembled, to be placed in operating engagement with the supporting lugs 4 by tilting the forward end of the guard and pan upward so that the rear edge flanges thereof can be inserted under and to the rear of the lugs 16.

The front or exposed end of the guard is open throughout its width, giving it practically a cut-off appearance so as to permit inspection of the broiling action without separating the pan and guard for the purpose. This also permits turning, removal and replacement of the meat when the guard is pulled out to stop position and the pan is pulled out a distance from full assembled relation to the guard, as shown in Fig. 2. When the guard and pan are in such positions, they are retained in aligned relation and prevented from relatively tipping by the interengaging action of the edge flanges thereof. The guard thus serves to support the pan in forwardly extended position during inspection, turning or transfer of the meat instead of requiring the pan to be entirely removed from the oven and placed on some other support for the purpose. The guard side walls at the front ends are braced and rigidly connected at their top edges by a cross-piece 17, which in the present instance is flat. The side and rear end walls of the guard preferably merge in curved form into the respective marginal edge walls of the top opening 11 so as to tend to deflect any edge spattering of grease toward the opening and consequently into the direct heat of the burner, whereby burning or volatizilation of such spattering grease is effected. To facilitate this action the top of the guard should be disposed in close relation to the burner, as shown.

It is found in practice that the use of this guard prevents the spattering grease, occurring during broiling, from escaping laterally in any direction from the pan against the upper side wall portions of the oven and causes all of such grease to be directed into the burner or into the intense heat radiating downwardly therefrom and thereby to be consumed.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. The combination with a substantially rectangular broiler pan having laterally projecting opposing side flanges, of a guard for the pan including spatter preventing side walls rising above said flanges and forming a top opening for exposing the major portion of the pan top to a superposed broiler heat, some of said side walls terminating at their lower edges in flanges which extend out over said pan flanges and slidingly embrace their free edges to adapt them to have relative parallel sliding movements longitudinal to said edges.

2. The combination with a substantially rectangular broiler pan having opposing laterally projecting side flanges, of a spatter guard for the pan having at least three side walls extending upwardly and inwardly from the respective edge portions of the pan to form a top opening over the major portion of the pan for admission of a broiling heat, said side walls preventing lateral spatter of grease during broiling and two of them having lower edge flanges adapted to have interengaging slide connection with said pan flanges.

3. The combination with a substantially rectangular broiler pan having opposing laterally projecting side flanges, of a spatter guard for the pan having side and rear walls, with the front side open, adapted to rest on the pan adjacent to its respective side edges and extending upwardly and inwardly from said edges, said walls forming a top opening over the major portion of the pan for the admission of a broiling heat, said open side permitting an interior view of the pan and guard during broiling and said walls deflecting and directing any side spatter of grease upwardly through said top opening.

4. The combination with a broiler pan of substantially rectangular form with longitudinally extending laterally projecting side edge flanges, and a meat supporting rack in the pan, of a spatter guard for the pan having side flanges resting on and in engagement with said pan flanges for sliding movements lengthwise thereof, said spatter guard flanges at their inner edges extending upward and inward over the adjacent edge portions of said rack to prevent grease from spattering laterally from the pan during broiling, said spatter guard flanges being connected at their front and rear edges.

5. An arrangement as called for in claim 4, wherein said rear edge connection forms a spatter guard at such edge of the pan corresponding to the side edge spatter guard flanges, the interengaged side flanges of the pan and guard cooperating to form side projections at opposed edges of the pan and guard for slidingly resting on side wall supports of an oven beneath a top broiling burner therein.

6. The combination with a substantially rectangular broiler pan having opposing laterally projecting side flanges, of a spatter guard for the pan having three side walls, with one side open, adapted to rest on the pan adjacent to its respective side and rear end edges and extending upwardly and inwardly from said edges, said walls forming a top opening over the major portion of the pan for the admission of a broiling heat, said open side permitting an interior view of the pan and guard during broiling and said walls deflecting and directing any side spatter of grease upwardly through said top opening, the base edge portions of opposing side walls of said spatter guard extending outwardly substantially parallel to and resting on the respective side flanges of the pan in interengaged longitudinal sliding engagement therewith.

7. In combination, an oven compartment having horizontal guide means on its interior side walls with open spaces therein substantially midway of their ends, stop lugs projecting from the side walls above said open spaces, a broiler pan having laterally projecting side and rear edge flanges, a removable spatter guard for said pan having, at least at its side and rear portions, walls extending upwardly and inwardly from the respective edge portions of the pan to form a top opening over the major portion thereof for the admission of broiling heat, the lower edges of said guard walls terminating in outturned flanges which seat on the respective pan flanges with the side flanges of one united for horizontal sliding engagement to the side flanges of the other to permit the pan and guard to be slid together or relatively on said guides, said guard having stop means on its rear edge flange for engagement with said stop lugs to limit the outward sliding movements of the guard on the guide means.

CHARLES A. PIERSON.

REFERENCES CITED

The following references are of record in the file of this patent:

UNITED STATES PATENTS

| Number | Name | Date |
|---|---|---|
| 934,991 | Buehl | Sept. 28, 1909 |
| 1,169,168 | Lane et al. | Jan. 25, 1916 |
| 1,560,847 | Parks | Nov. 10, 1925 |
| 1,819,660 | Stone | Aug. 18, 1931 |
| 1,889,218 | Reedy | Nov. 29, 1932 |
| 1,961,391 | Reedy et al. | June 5, 1934 |
| 1,974,830 | Moecker | Sept. 25, 1934 |